United States Patent [19]

Sugimura et al.

[11] Patent Number: 4,630,140
[45] Date of Patent: Dec. 16, 1986

[54] DATA RECORDING/REPRODUCING APPARATUS

[75] Inventors: Tatuo Sugimura, Kyoto; Isao Satoh, Osaka; Makoto Ichinose, Osaka; Yuzuru Kuroki, Osaka, all of Japan

[73] Assignee: Matsushita Electric Industrial Co., Ltd., Osaka, Japan

[21] Appl. No.: 597,232

[22] Filed: Apr. 5, 1984

[30] Foreign Application Priority Data

Apr. 8, 1983 [JP] Japan .................................. 58-62438

[51] Int. Cl.$^4$ ................................................ G11B 5/09
[52] U.S. Cl. ........................................ 360/49; 360/47
[58] Field of Search .................................. 360/47, 49

[56] References Cited

U.S. PATENT DOCUMENTS 3,264,623  8/1966  Gabor ..................................... 360/47
3,761,903  9/1973  Bird, Jr. et al. ........................ 360/47
4,126,887  11/1978  Miyazaki ............................... 360/49
4,506,306  3/1985  Veillard ................................. 360/47

Primary Examiner—Vincent P. Canney
Attorney, Agent, or Firm—Burgess, Ryan & Wayne

[57] ABSTRACT

A data recording/reproducing apparatus which uses a recording medium having a data recording area divided into a plurality of sectors, each sector having an address section in which a first address signal is recorded and a data recording section, wherein a second address signal is added to data to be recorded, the second address signal representing an address of a sector in which the data is to be recorded, the data combined with the second address signal is encoded for error compensation and is recorded in the recording mode, and the second address signal reproduced with the data from the data recording section in the reproduction mode is used to discriminate an address of a target sector for reproduction. The sector address is obtained with the same level of precision as that of the reproduced data, thereby performing precise sector control and preventing data loss.

3 Claims, 3 Drawing Figures

DATA RECORDING/REPRODUCING APPARATUS

BACKGROUND OF THE INVENTION

I. Field of the Invention

The present invention relates to a data recording/reproducing apparatus which uses a recording medium having a data recording area divided into a plurality of sectors.

II. Description of the Prior Art

In a conventional data recording/reproducing apparatus for performing recording/reproduction of data in units of sectors, data is recorded in a predetermined sector in the recording mode. The predetermined sector is searched in the reproduction mode to reproduce the corresponding data therefrom. It must be possible to reproduce the recorded data. For this reason, in the conventional data recording/reproducting apparatus, a system is employed wherein an address section is provided at the beginning of each sector. Another system is employed wherein a sector separation signal inserted between two adjacent sectors is counted to obtain addresses of the sectors. However, in order to effectively use a data signal recording area, the address section corresponds only to a very short period of time. When a part of the recording medium which corresponds to an address section is damaged or contaminated with dust, part of the address signal is lost. It is impossible to record an address signal in accordance with an effective error control system which can compensate for signal loss in the reproduction mode. Therefore, the address signals of the respective sectors have poor reliability as compared with the reliability of the data signals. Under these circumstance, data is recorded in the recording mode only in a sector whose address can be distinctly accessed. In the reproduction mode, only sectors having an address specified by a directory are accessed. However, even if a sector address is discriminated in the recording mode, it is not always discriminated in the reproduction mode because of damage and contamination with dust after recording. In this case, the operator repeatedly tries to access the corresponding sector, thus resulting in throughput loss. In the worst case, when discrimination of the sector address fails completely, the data recorded in this sector is lost.

SUMMARY OF THE INVENTION:

It is, therefore, an object of the present invention to provide a data recording/reproducing apparatus wherein data can be reproduced by substantially a single operation in the reproduction mode to improve the throughput, data loss can be prevented, a highly reliable sector address can be obtained, and hence precise sector control can be performed.

In a data recording/reproducing apparatus for recording/reproducing data in units of sectors, the principle of operation is that whenever data is recorded in a proper sector, it can be reproduced from the proper sector. In other words, when data is recorded at a proper position, accidental overrecording (i.e., accidental deletion of the previously recorded data) is prevented. When the desired data is recorded in the proper sector, it is natural that the data can be reproduced from this proper sector. It is thus important to access the actual recorded data rather than the sector addresses (positions of the sectors on the recording medium). In the conventional system, data is lost if the corresponding sector address is not accessed; there is thus a failure to properly evaluate the relative importance of the recorded data.

According to the present invention, data is recorded together with a corresponding sector address in the recording mode. In the reproduction mode, the target sector and its vicinity are subjected to reproduction, and only the data from the target sector is read out in response to the highly-reliable sector address signal superposed on the data.

DETAILED DESCRIPTION OF THE PREFERRED EMBODIMENT

Figure 1:
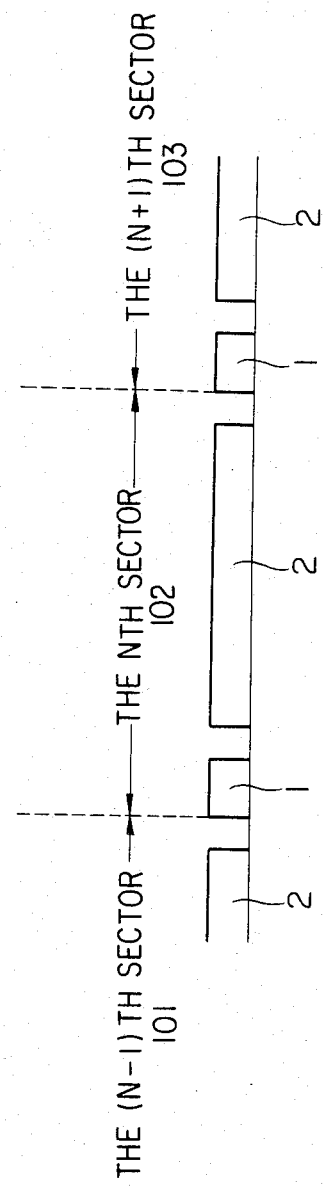
FIG. 1 shows a recording format of a recording medium used for a data recording/reproducing apparatus according to an embodiment of the present invention.

FIG. 1 shows a recording format of a recording medium used for a data recording/reproducing apparatus according to an embodiment of the present invention. Consecutive sectors on the recording track are illustrated. Reference numeral 1 denotes an address section; 2, a data recording section; and 101 to 103, sectors, respectively. Each sector comprises an address section 1 and a data recording section 2. When a sector address of the nth sector 102 is given to be n, the sector address n is recorded in the address section 1 of the nth sector 102 at the time of formatting or the like before data recording/reproduction.

Figure 2:
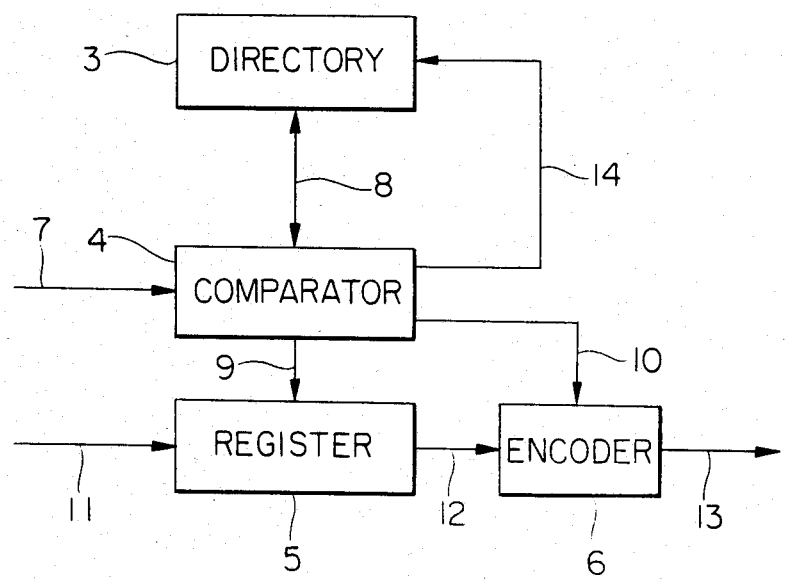
FIG. 2 is a block diagram of a recording circuit of an embodiment of the present invention.

FIG. 2 is a block diagram of a recording circuit for recording data on a recording medium having the recording format shown in FIG. 1. A directory 3 comprising a CPU or the like discriminates a sector address. When data 11 is recorded, the directory 3 discriminates a sector in which the data 11 can be recorded, and supplies to a comparator 4 a write address signal 8 representing the address of this sector. The comparator 4 supplies the write address signal 8 as an additional address signal 9 to a register 5. The register 5 adds the additional address signal 9 to the beginning or end of the data 11 in a time serial manner, thereby preparing write data 12.

On the other hand, the comparator 4 also receives an address signal 7 reproduced from the address section 1 of the sector by means of a write/read head. When a coincidence between the reproduced address signal 7 and the write address signal 8 is established by the comparator 4, the comparator 4 generates a recording trigger signal 10. When an encoder 6 receives the recording trigger signal 10, it encodes the write data 12 so as to perform error control. Encoded data 13 as an output from the encoder 6 is recorded in the data recording section 2.

The encoder 6 divides the write data 12 into several blocks which are interleaved.

However, when the comparator 4 does not detect a coincidence between the reproduced address signal 7 and the write address signal 8, the comparator 4 supplies a sector nondetection signal 14 to the directory 3. In general, the sector addresses of the consecutive sectors increase sequentially. Therefore, when the sector nondetection signal 14 is generated, the recording trigger signal 10 is not generated wherein the address sections 1 of the respective sectors are sequentially accessed as the write/read head searches for the target sector. When the directory 3 receives the sector nondetection signal 14, the directory 3 discriminates as a bad sector the sector specified by the write address signal 8 and selects another write address signal 8.

On the other hand, when an area to be recorded with data is distinctly detected to be a nonrecorded area, the following recording operation can be performed. The comparator 4 supplies to the register 5 the address signal 7 (reproduced by the write/read head) as the additional address signal 9. The comparator 4 also supplies to the directory 3 the address signal 7 as the write address signal 8, so that the recording trigger signal 10 is unconditionally supplied to the encoder 6. The directory 3 prepares a directory map in response to the write address signal 8 supplied thereto. This method is particularly effective in preparing a sequential file in the nonrecorded area.

Figure 3:
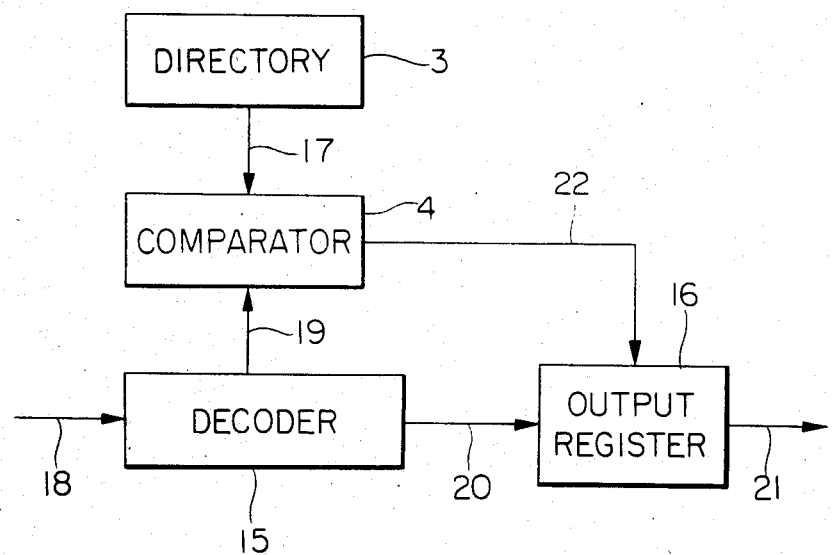
FIG. 3 is a block diagram of a reproduction circuit of an embodiment of the present invention.

FIG. 3 is a block diagram of a data reproducing circuit for reproducing data recorded by the recording circuit shown in FIG. 2.

When a specific sector is accessed, the directory 3 reads out the address signal from this sector, and this address signal is supplied as a read address signal 17 to the comparator 4. The write/read head reads out the address section 1 of the sector so as to perform a coarse search for the target sector. Reproduced data 18 is obtained for several sectors including the target sector by reproducing the data recording sections 2 thereof. The reproduced data 18 for each sector is then supplied to a decoder 15. The decoder 15 decodes the reproduced data 18, and decoded data 20 and an address signal 19 as a part of the decoded data 20 are supplied to an output register 16 and to the comparator 4, respectively. The comparator 4 compares the read address signal 17 with the address signal 19. When a coincidence is established between the read address signal 17 and the address signal 19, the comparator 4 generates an output trigger signal 22 which is supplied to an output register 16. The output register 16 then generates the stored decoded data 20 as output data 21. However, when the write address signal 17 does not coincide with the address signal 19, the decoded data 20 stored in the output register 16 is neglected, and the reproduced data 18 of the next sector is fetched. Then, the read address signal 17 and the address signal are compared again. In this manner, a fine search for the target sector is performed. When the read address signal 17 coincides with the address signal 19, the output register 16 generates the output data 21.

In the data recording/reproducing apparatus described above, when data is recorded in a given sector, the address section 1 of this sector can always be read out. The readout address signal 7 coincides with the additional address signal 9 in the data recorded in the data recording section 2 of this sector. However, in the reproduction mode, the address of this sector occasionally cannot be read out from the address section 1. This is caused by damage of the address section or its contamination thereof with dust. In general, the memory capacity of the address section 1 is smaller than that of the data recording section 2 and is very small with respect to the total area of the recording medium. For this reason, error control cannot be satisfactorily performed in the address section 1, as compared with error control in the data recording section 2.

However, according to the present invention, the additional address is recorded together with the data signal in the data recording section 2 in a distributed manner. Therefore, loss of the additional address recorded together with the data signal on the data recording section 2 for a short period of time due to slight damage to or attachment of dust can be compensated in the same manner as in the data signal. Therefore, even if the sector address of the target sector is not derived from the address section 1 thereof, the data recording section 2 is reproduced to detect the sector address thereof, thereby reproducing the recorded data. In the reproduction mode, the sector address of the target sector can be known to the same level of precision as that of the reproduced data. Therefore, incapability of data reproduction which is caused by discrimination incapability of the sector address of the target sector can be greatly reduced.

What is claimed is:

1. A data recording/reproducing apparatus comprising: means for recording/reproducing data with respect to a recording medium which has data recording tracks divided into a plurality of sectors, each of said plurality of sectors having an address section and a data section, said address section having a prerecorded first address signal which represents a corresponding sector; means for adding, in an interleaved manner, in a recording mode, a second address signal to data to be recorded, the second address signal representing an address of a sector included in said plurality of sectors and being recorded with said data in a respective data section; and means for detecting the second address signal added to the recorded data.

2. An apparatus according to claim 1, wherein the second address signal is combined with the data to be recorded, and the composite data and address signals are encoded for error compensation and are recorded in a distributed manner over an entire data recording area of the recording medium.

3. An apparatus according to claim 1, wherein the second address signal added to the data to be recorded comprises a reproduced signal of the first address signal prerecorded on the recording medium.

* * * * *